(12) United States Patent
Shikata et al.

(10) Patent No.: US 11,272,153 B2
(45) Date of Patent: Mar. 8, 2022

(54) INFORMATION PROCESSING APPARATUS, METHOD FOR CONTROLLING THE SAME, AND RECORDING MEDIUM

(71) Applicant: CANON KABUSHIKI KAISHA, Tokyo (JP)

(72) Inventors: Yasushi Shikata, Tama (JP); Norihisa Suzuki, Matsudo (JP); Kazuna Maruyama, Fuchu (JP); Tomoaki Arai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/226,218

(22) Filed: Dec. 19, 2018

(65) Prior Publication Data

US 2019/0199992 A1    Jun. 27, 2019

(30) Foreign Application Priority Data

Dec. 25, 2017    (JP) .............................. JP2017-248475

(51) Int. Cl.

| | |
|---|---|
| *H04N 13/117* | (2018.01) |
| *G06T 19/00* | (2011.01) |
| *G06F 3/04815* | (2022.01) |
| *G06F 9/30* | (2018.01) |
| *H04N 13/279* | (2018.01) |
| *G06T 7/70* | (2017.01) |
| *H04N 13/243* | (2018.01) |

(52) U.S. Cl.
CPC ....... *H04N 13/117* (2018.05); *G06F 3/04815* (2013.01); *G06F 9/30003* (2013.01); *G06T 7/70* (2017.01); *G06T 19/00* (2013.01); *H04N 13/243* (2018.05); *H04N 13/279* (2018.05)

(58) Field of Classification Search
CPC ...................................................... G06T 19/00
See application file for complete search history.

(56) References Cited

U.S. PATENT DOCUMENTS

| | | | | |
|---|---|---|---|---|
| 2010/0302402 | A1* | 12/2010 | Asajima | G06T 15/205 348/222.1 |
| 2013/0107020 | A1* | 5/2013 | Hashimoto | G03B 17/18 348/50 |
| 2016/0027209 | A1* | 1/2016 | Demirli | G06F 3/015 345/419 |
| 2016/0227190 | A1* | 8/2016 | Cole | G06F 3/012 |

(Continued)

FOREIGN PATENT DOCUMENTS

| | | |
|---|---|---|
| JP | 2008217243 A | 9/2008 |
| JP | 2015187797 A | 10/2015 |

*Primary Examiner* — Phi Hoang
(74) *Attorney, Agent, or Firm* — Canon U.S.A., Inc. IP Division

(57) ABSTRACT

An information processing apparatus for determining a position of a virtual viewpoint for a virtual viewpoint image generated based on a plurality of images captured by a plurality of imaging apparatuses includes a first acquisition unit configured to acquire position information indicating a position existing within a predetermined range from a field to be captured by the plurality of imaging apparatuses, and a determination unit configured to determine, as the position of the virtual viewpoint for the virtual viewpoint image, a position different from the position indicated by the position information, based on the position information acquired by the first acquisition unit.

18 Claims, 11 Drawing Sheets

(56) References Cited

U.S. PATENT DOCUMENTS

| | | | |
|---|---|---|---|
| 2016/0239181 A1* | 8/2016 | You | G06F 3/04815 |
| 2017/0094259 A1* | 3/2017 | Kouperman | H04N 13/243 |
| 2017/0318275 A1* | 11/2017 | Khalid | H04N 13/122 |
| 2018/0225840 A1* | 8/2018 | Ikeda | G06K 9/00335 |
| 2018/0350147 A1* | 12/2018 | Lodato | H04N 13/282 |

* cited by examiner

FIG.3
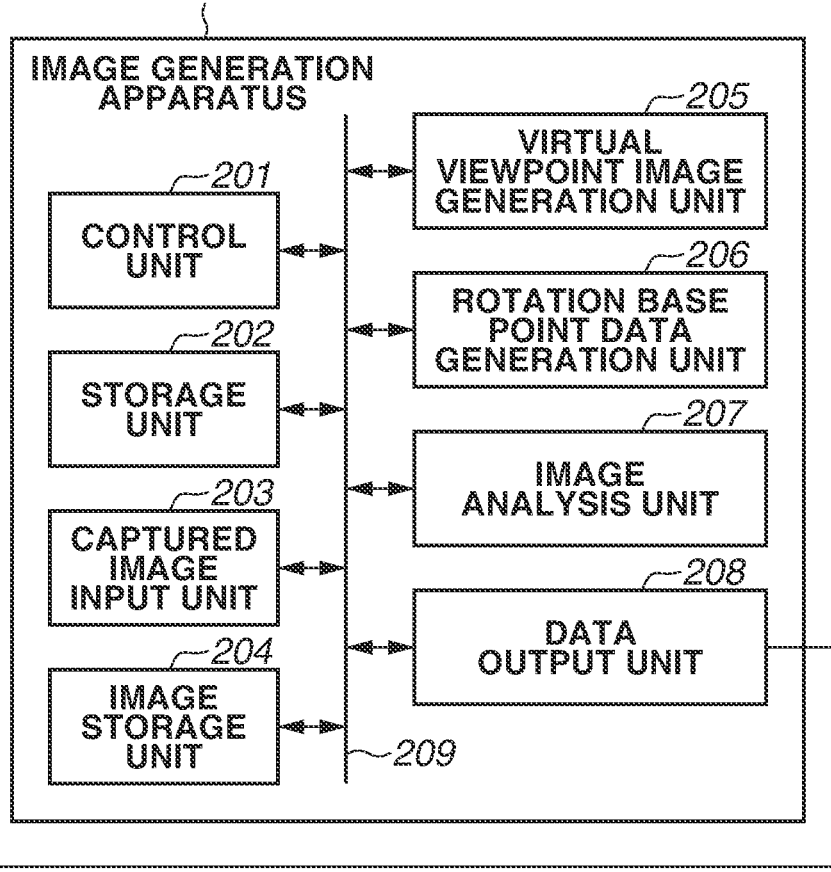
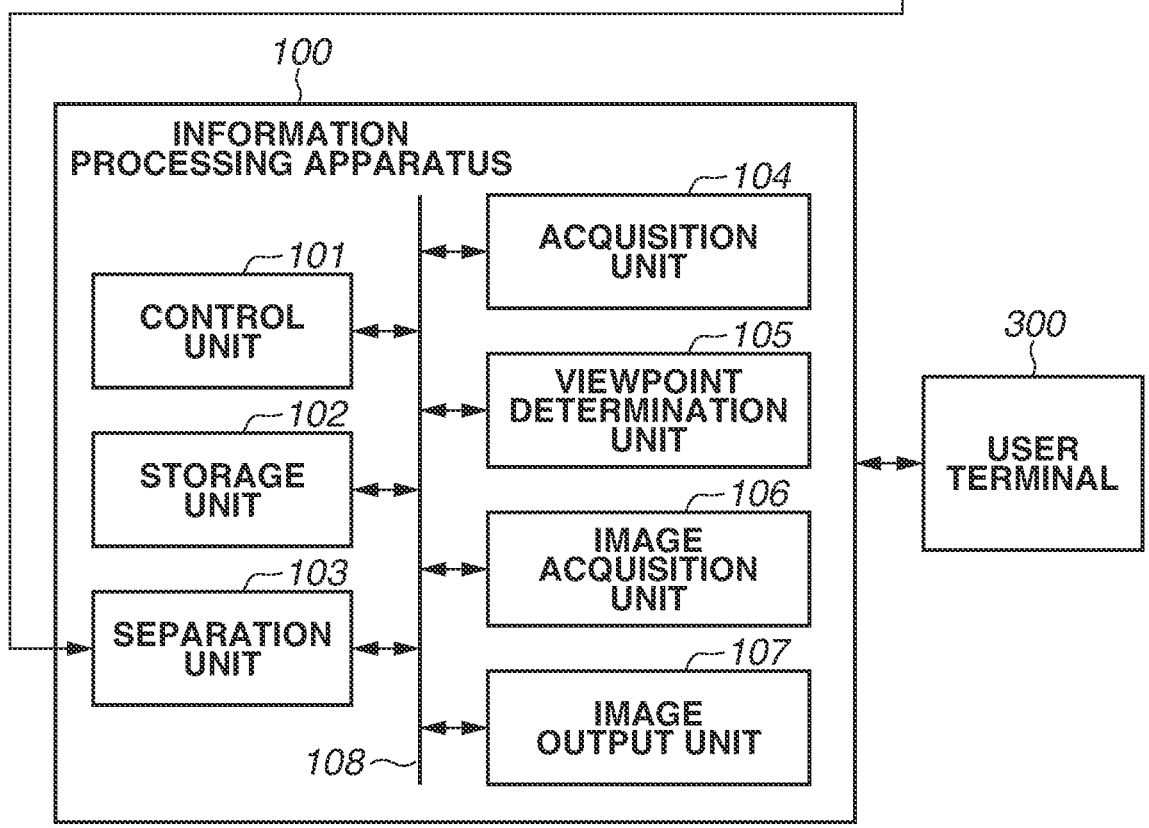

FIG.9

| OBSTACLE | INSTALLATION POSITION (LATITUDE/LONGITUDE IN DEGREES) | DIMENSIONS (WIDTH × HEIGHT × DEPTH) |
|---|---|---|
| GOAL 1 | xx.xxxxx/yy.yyyyy | 732 cm × 244 cm × 200 cm |
| GOAL 2 | xx.xxxxx/yy.yyyyy | 732 cm × 244 cm × 200 cm |
| CRANE CAMERA 1 | xx.xxxxx/yy.yyyyy | 812 cm × 600 cm × 54 cm |

INFORMATION PROCESSING APPARATUS, METHOD FOR CONTROLLING THE SAME, AND RECORDING MEDIUM

BACKGROUND

Field of the Disclosure

The present disclosure relates to a technique for generating a virtual viewpoint image.

Description of the Related Art

There is a technique for synchronously capturing images of a subject by using a plurality of imaging apparatuses installed at different positions, and generating not only images captured from installation positions of the imaging apparatuses but also a virtual viewpoint image of an arbitrary viewpoint, by using the images of a plurality of viewpoints obtained in this image capturing. For example, if a virtual viewpoint image corresponding to a user-specified viewpoint is generated based on captured images of a sporting event, a user can watch the game from a viewpoint desired by the user. Japanese Patent Application Laid-Open No. 2008-217243 discusses a technique for generating a virtual viewpoint image based on images captured by a plurality of imaging apparatuses.

Suppose an example case where a user watching a sporting event in a stadium views a virtual viewpoint image of the sporting event by using a display apparatus such as a mobile terminal. In this case, the user can view the event from a viewpoint which the user can hardly see from the user's position, thereby obtaining more enjoyment.

However, a user unfamiliar with such a setting for a virtual viewpoint possibly takes a long time to set a virtual viewpoint in consideration of the field of view at the user's position, or hardly set a virtual viewpoint at a desired position. In this case, the user may concentrate on the operation for setting a virtual viewpoint while the game is progressing in real time, possibly missing a part of the event. There is a demand for a technique for enabling such a user who is unfamiliar with virtual viewpoint setting to easily set the viewpoint for a virtual viewpoint image. A viewing target related to a virtual viewpoint image is not limited to a sporting event, and a similar demand may occur at a concert or other events.

SUMMARY

According to an aspect of the present disclosure, an information processing apparatus for determining a position of a virtual viewpoint for a virtual viewpoint image generated based on a plurality of images captured by a plurality of imaging apparatuses includes a first acquisition unit configured to acquire position information indicating a position existing within a predetermined range from a field to be captured by the plurality of imaging apparatuses, and a determination unit configured to determine, as the position of the virtual viewpoint for the virtual viewpoint image, a position different from the position indicated by the position information, based on the position information acquired by the first acquisition unit.

Further features of the present disclosure will become apparent from the following description of exemplary embodiments with reference to the attached drawings.

BRIEF DESCRIPTION OF THE DRAWINGS

FIG. 3 is a block diagram illustrating the configuration of the image processing system.

FIG. 9 is a table illustrating an example of obstacle information.

DESCRIPTION OF THE EMBODIMENTS

Figure 1:
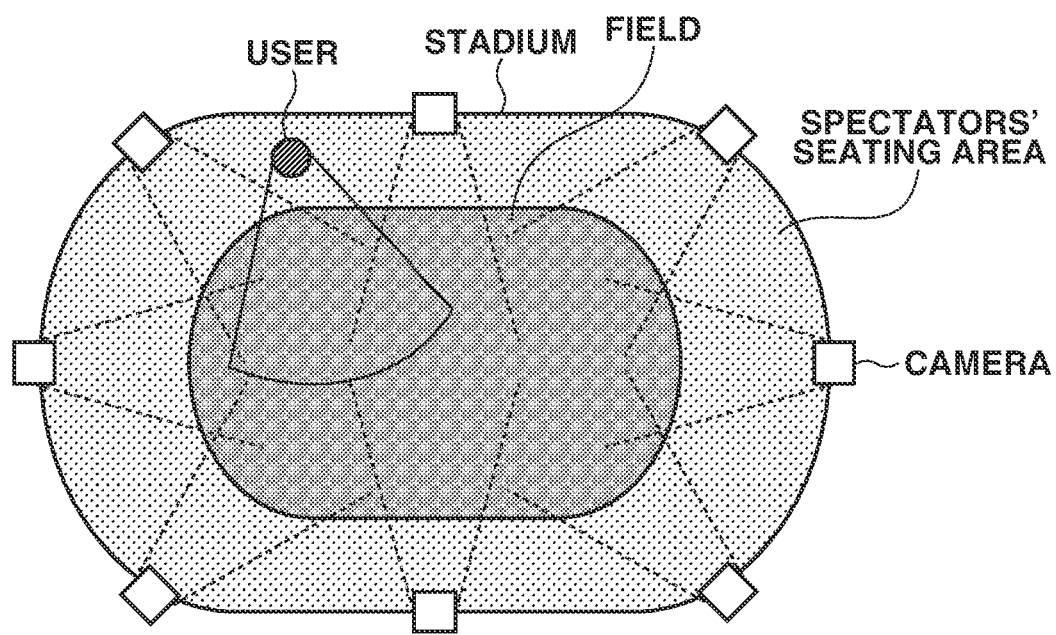
FIG. 1 illustrates an overall configuration of an image processing system.

An exemplary embodiment will be described below with reference to the accompanying drawings. FIG. 1 illustrates an example of an overall configuration of an image processing system according to the present exemplary embodiment. As illustrated in FIG. 1, a plurality of cameras is installed in a stadium including a field on which sporting events or the like are performed, and a spectators' seating area. The plurality of cameras is installed to surround the field and spectators' seating area. A user watches the event from the spectators' seating area.

Figure 2:
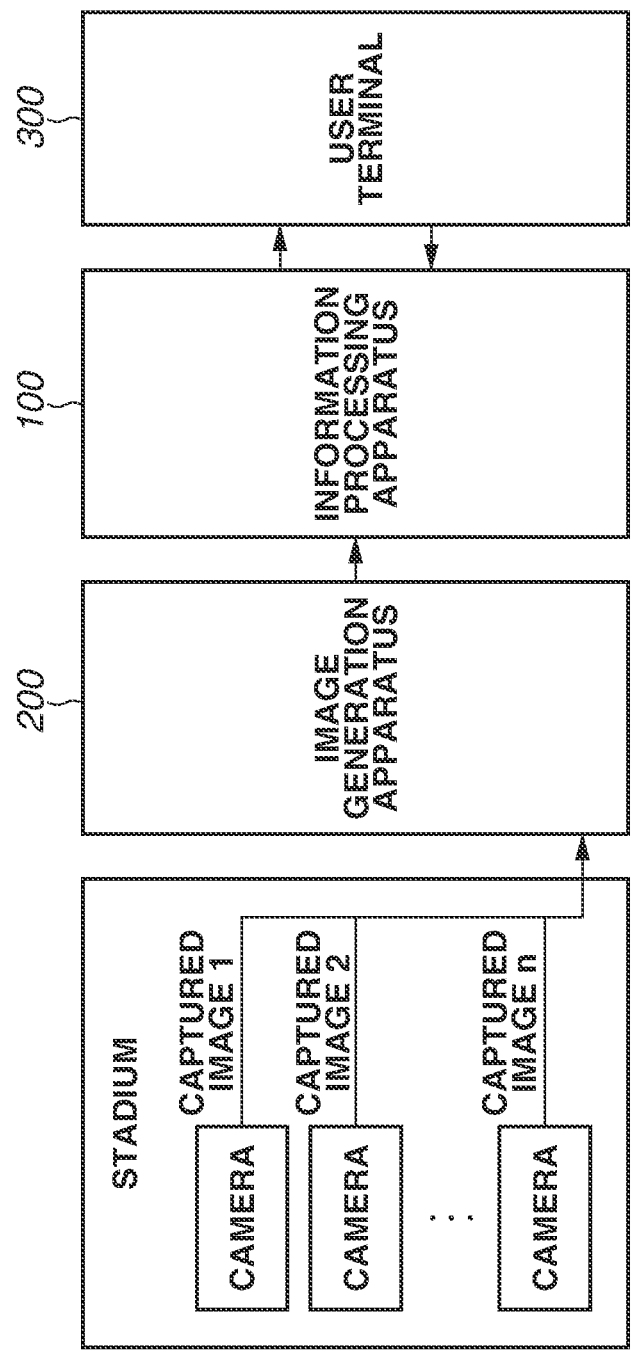
FIG. 2 is a block diagram illustrating the image processing system.

A configuration of the image processing system according to the present exemplary embodiment will be described below with reference to FIG. 2. As illustrated in FIG. 2, the image processing system includes the plurality of cameras installed in the stadium, an image generation apparatus 200, an information processing apparatus 100, and a user terminal 300. The plurality of cameras is connected with each other via transmission cables. The plurality of cameras transmits captured images to the image generation apparatus 200. Referring to an example illustrated in FIG. 1, the plurality of cameras is disposed so as to capture an entire range or a part of the range of the stadium such as a soccer stadium. Each of the plurality of cameras may be a camera for capturing a still image, a moving image, or both a still image and a moving image. Unless otherwise noted, in the present exemplary embodiment, the term "image" means both a still image and a moving image.

The image generation apparatus 200 is an apparatus for generating a virtual viewpoint image. The image generation apparatus 200 accumulates images captured by the plurality of cameras. The image generation apparatus 200 generates a virtual viewpoint image group by using images captured with the plurality of cameras. A virtual viewpoint image group includes a plurality of virtual viewpoint images having different viewpoints. Thus generated virtual viewpoint images in the image generation apparatus 200 are transmitted to the information processing apparatus 100. The image generation apparatus 200 is, for example, a server apparatus having a database function for storing a plurality of captured images and a generated virtual viewpoint image group, and an image processing function for generating virtual viewpoint images. The plurality of cameras in the stadium and the image generation apparatus 200 are connected via a wired or wireless communication network line or a cable line such as Serial Digital Interface (SDI). The image generation apparatus 200 receives captured images from the plurality of cameras via these lines and stores the images in a database.

The information processing apparatus 100 selects a virtual viewpoint mage, which is to be offered to the user terminal 300, from the virtual viewpoint image group generated by the image generation apparatus 200. In other words, the information processing apparatus 100 is an apparatus for determining a viewpoint position and a line-of-sight direction for the virtual viewpoint image to be output. When the information processing apparatus 100 acquires virtual viewpoint information based on a user's operation from the user terminal 300, the information processing apparatus 100 determines a position and a direction corresponding to the virtual viewpoint information as a viewpoint position and a line-of-sight direction for a virtual viewpoint image. The virtual viewpoint information includes at least position information and direction information. The information processing apparatus 100 selects a virtual viewpoint image corresponding to the virtual viewpoint information from the virtual viewpoint image group, and outputs the selected virtual viewpoint image. The information processing apparatus 100 may generate a virtual viewpoint image corresponding to the virtual viewpoint information by performing image processing on the virtual viewpoint image group generated by the image generation apparatus 200.

When the information processing apparatus 100 acquires user position information from the user terminal 300, the information processing apparatus 100 selects and outputs a virtual viewpoint image corresponding to the user position information from the virtual viewpoint image group generated by the image generation apparatus 200. The information processing apparatus 100 may generate a virtual viewpoint image corresponding to the position information about the user terminal 300 by performing image processing on the virtual viewpoint image group generated by the image generation apparatus 200.

The information processing apparatus 100 is, for example, a personal computer. The information processing apparatus 100 may be built in the image generation apparatus 200, and may be built in the user terminal 300. In other words, the information processing apparatus 100 may be integrated with the image generation apparatus 200 or may be integrated with the user terminal 300.

The user terminal 300 is an information processing apparatus owned by the user who uses the image processing system according to the present exemplary embodiment. The user terminal 300 may be an information processing apparatus associated with a user's identifier (ID). The user terminal 300 displays the virtual viewpoint image output from the information processing apparatus 100 on a display screen provided on the user terminal 300. Based on a user's input, the user terminal 300 receives, for example, an instruction for moving the position of the virtual viewpoint, an instruction for changing the line-of-sight direction of the virtual viewpoint, and an instruction for switching the viewpoint. Then, the user terminal 300 transmits the contents of the instructions to the information processing apparatus 100 as virtual viewpoint information. The user terminal 300 also requests the information processing apparatus 100 to perform automatic virtual viewpoint setting based on the position information of the user terminal 300. The user terminals 300 is a personal computer (PC), a mobile phone such as a smart phone, or a tablet computer, and is provided with at least one of a mouse, keyboard, 6-axis controller, and touch panel. The user terminal 300 has a function of acquiring position information based on a Global Positioning System (GPS).

The image generation apparatus 200, the information processing apparatus 100, and the user terminal 300 are capable of exchanging information with each other via a network such as the Internet. These apparatuses may communicate with each other through wireless or wired communication.

Figure 7:
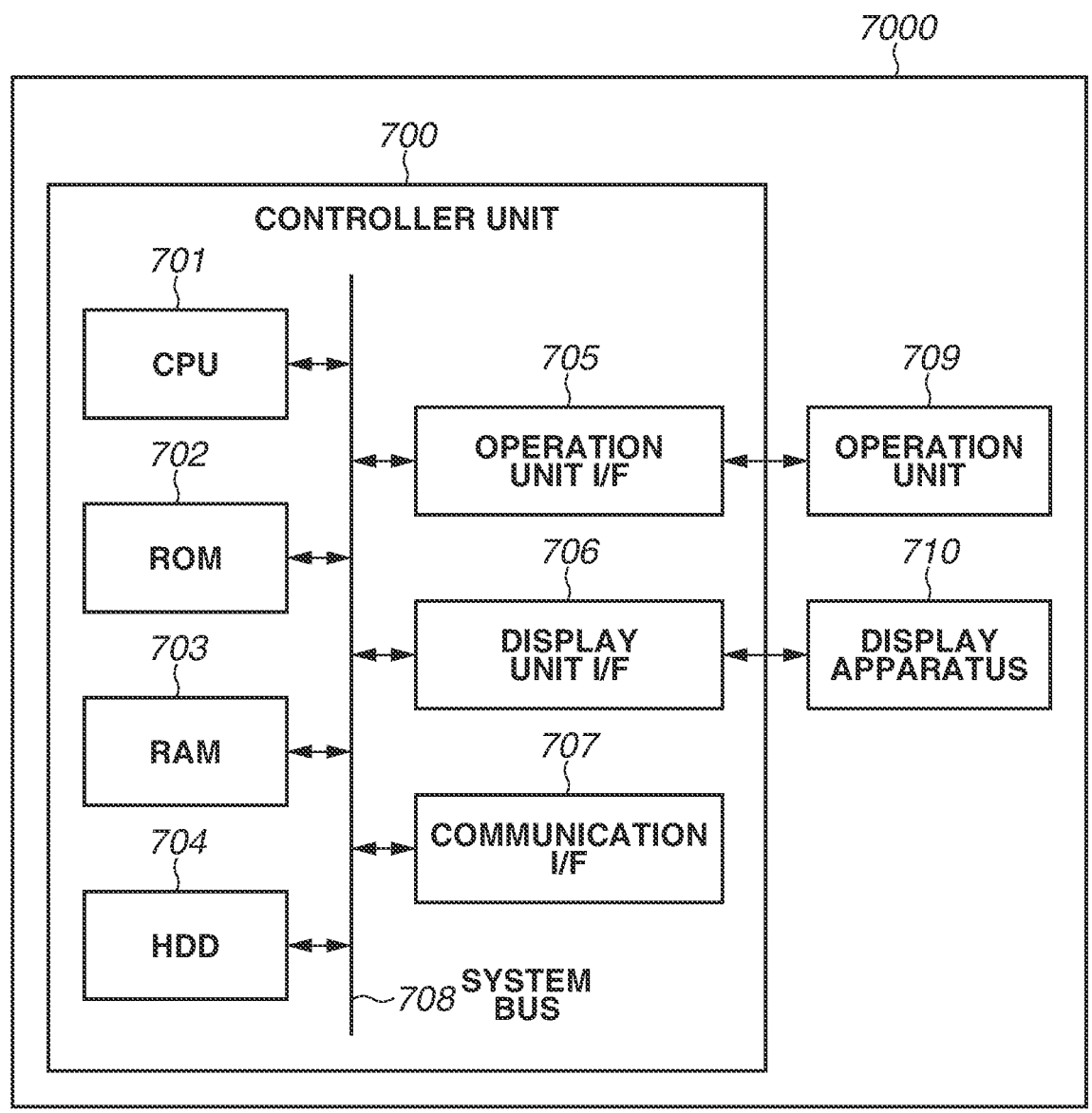
FIG. 7 is a block diagram illustrating a hardware configuration of an apparatus.

Next, an example of a configuration of the image generation apparatus 200, the information processing apparatus 100, and the user terminal 300 will be described. FIG. 7 illustrates an example of a hardware configuration of the image generation apparatus 200, the information processing apparatus 100, and the user terminal 300. An apparatus 7000 (the user terminal 300, the image generation apparatus 200, or the information processing apparatus 100) includes a controller unit 700, an operation unit 709, and a display apparatus 710.

The controller unit 700 includes a central processing unit (CPU) 701. The CPU 701 activates an operating system (OS) by using a boot program stored in a read only memory (ROM) 702. The CPU 701 executes application programs stored in a hard disk drive (HDD) 704 on the OS. The CPU 701 implements various processing through the execution of application programs. A random access memory (RAM) 703 is used as a work area of the CPU 701. The CPU 701 may include one processor or a plurality of processors.

The CPU 701 is connected to the ROM 702, the RAM 703, an operation unit interface (I/F) 705, a display unit I/F 706, and a communication I/F 707 via a system bus 708. The operation unit I/F 705 is an interface with the operation unit 709. The operation unit I/F 705 sends information input by the user to the CPU 701 via the operation unit 709. The operation unit 709 includes a mouse and a keyboard. The display unit I/F 706 outputs image data to the display apparatus 710 to be displayed. The display apparatus 710 includes a display device such as a liquid crystal display device. The communication I/F 707 is an interface for communicating with, for example, Ethernet® and is connected to a transmission cable. The communication I/F 707 outputs and inputs information to/from an external apparatus via the transmission cable. The communication I/F 707 may be a circuit or antenna for performing wireless communication. The apparatus 7000 can also perform control to display an image on the display apparatus 710 externally connected to the apparatus 7000 via a cable or network. In this case, the apparatus 7000 outputs display data to the display apparatus 710. Note that not all of the components illustrated in FIG. 7 are indispensable for the image generation apparatus 200 or the information processing apparatus 100. For example, for the image generation apparatus 200, the display apparatus 710 is not necessary. The controller unit 700 has been described above to include the CPU 701, the configuration is not limited thereto. Instead of the CPU 701 or together with the CPU 701, the controller unit 700 may include hardware components such as an application specific integrated circuit (ASIC) and field programmable gate array (FPGA). In this case, a hardware component such as an ASIC and FPGA may perform all or part of processing to be executed by the CPU 701.

<Information Processing Apparatus>

Examples of function configurations of the information processing apparatus 100 and the mage generation apparatus 200 will be described below with reference to FIG. 3. FIG. 3 illustrates examples of function configurations of the information processing apparatus 100 and the image generation apparatus 200 according to the present exemplary embodiment. Each of the configurations illustrated in FIG. 3 is implemented when the CPU 701 illustrated in FIG. 7 reads various programs stored in the ROM 702 and performs control of each unit. All or a part of the components illustrated in FIG. 3 may be implemented by a dedicated hardware component such as an ASIC and FPGA.

As illustrated in FIG. 3, the information processing apparatus 100 includes a control unit 101, a storage unit 102, a separation unit 103, an acquisition unit 104, a viewpoint determination unit 105, an image acquisition unit 106, and an image output unit 107. These units are connected with each other via an internal bus 108, and exchange data with each other under the control of the control unit 101.

The control unit 101 controls overall operations of the information processing apparatus 100 based on a computer program stored in the storage unit 102. The storage unit 102 includes a nonvolatile memory such as a hard disk. The nonvolatile memory in the storage unit 102 stores a computer program for controlling overall operations of the information processing apparatus 100. The separation unit 103 outputs a virtual viewpoint image group and rotation base point data acquired from the image generation apparatus 200 in a separated way. The rotation base point data will be described in detail below.

The acquisition unit 104 acquires position information or virtual viewpoint information about the user from the user terminal 300. The position information may be acquired by the user terminal 300 through a global positioning system (GPS). The acquisition unit 104 may acquire information such as a seat number of spectators' seats of the stadium, and user position information may be determined based on the acquired information. The acquisition unit 104 may acquire a position on a map information of the stadium identified by a user as user position information. The acquisition unit 104 may identify the user position information based on the position information about the user terminal 300 and the distance from the user measured by the user terminal 300. The acquisition unit 104 may acquire position information indicating the position, which is within the stadium site, where a player on the field and a predetermined position of the field, as imaging targets for the plurality of cameras, can be viewed. The acquisition unit 104 may acquire position information indicating a position within a predetermined range from the field as an imaging target. The predetermined range may be a range, for example, 10 m or less from the field. The predetermined range may be a range within several meters to several tens of meters from the stadium as an imaging target. The predetermined range may also be a range where there are persons, such as the stadium having a field as an imaging target. The predetermined range may be a range within several meters to several tens of meters from the seat number acquired from the user. The predetermined range may be a range where there are persons, such as the seat area having the field as an imaging target. The predetermined range may be a range where there are persons, such as a range within several meters to several tens of meters from a rotation base point. If the position indicated by the acquired position information is out of a predetermined range in the stadium having the field as an imaging target, the information processing apparatus 100 may terminate the processing as an error. If the position indicated by the position information acquired by the acquisition unit 104 is a position where a player on the field or a predetermined position on the field as imaging targets of the plurality of cameras cannot be viewed, the information processing apparatus 100 may terminate the processing as an error. The acquisition unit 104 may acquire position information indicating a position within a predetermined range from the rotation base point (described below), where the rotation base point can be viewed. If the information processing apparatus 100 acquires position information indicating a position out of a predetermined range from the rotation base point (described below), where the rotation base point cannot be viewed, the information processing apparatus 100 may terminate the processing as an error.

The viewpoint determination unit 105 determines the viewpoint position and/or line-of-sight direction for the virtual viewpoint image to be output to the user terminal 300. Although the following description will be made on the premise that the viewpoint determination unit 105 determines a position on three-dimensional coordinates as the position of the viewpoint for the virtual viewpoint image, the viewpoint determination unit 105 may be configured to determine a position on a two-dimensional plane. In this case, the viewpoint determination unit 105 may determine the height of the position of the viewpoint for the virtual viewpoint image as an arbitrary or fixed value without using the position information acquired by the acquisition unit 104.

When the acquisition unit 104 acquires the virtual viewpoint information from the user terminal 300, the viewpoint determination unit 105 determines the position and direction indicated by the virtual viewpoint information as the viewpoint position and line-of-sight direction for the virtual viewpoint image to be output to the user terminal 300. When the acquisition unit 104 acquires position information from the user terminal 300, the viewpoint determination unit 105 also determines the viewpoint position and line-of-sight direction for the virtual viewpoint image based on the rotation base point data and position information separated by the separation unit 103. The image acquisition unit 106 acquires the virtual viewpoint image corresponding to the viewpoint determined by the viewpoint determination unit 105. The image acquisition unit 106 may have a function of rendering the virtual viewpoint image based on information received from the image generation apparatus 200 and generating an image. The image output unit 107 outputs the image acquired by the image acquisition unit 106 to the user terminal 300.

<Image Generation Apparatus>

An example of a function configuration of the image generation apparatus 200 will be described below with reference to FIG. 3.

The image generation apparatus 200 includes a control unit 201, a storage unit 202, a captured image input unit 203, an image storage unit 204, a virtual viewpoint image generation unit 205, a rotation base point data generation unit 206, an image analysis unit 207, and a data output unit 208. These units are connected with each other via an internal bus 209, and transmit and receive data with each other under the control of the control unit 201.

The control unit 201 controls the overall operations of the image generation apparatus 200 based on computer programs stored in the storage unit 202. The storage unit 202 includes a nonvolatile memory such as a hard disk. The nonvolatile memory in the storage unit 202 stores computer programs for controlling the overall operations of the information processing apparatus 100.

The captured image input unit 203 acquires images captured by the plurality of cameras installed in the stadium with a predetermined frame rate and outputs the images to the image storage unit 204. The captured image input unit 203 acquires captured images through a wired or wireless communication module or an image transmission module such as an SDI. The image storage unit 204 is mass storage device for storing captured images acquired by the captured image input unit 203 and a virtual viewpoint image group generated based on the captured images. The image storage unit 204 includes a magnetic disk, optical disc, and semiconductor memory. The image storage unit 204 may be physically disposed outside the image generation apparatus 200. The captured images and the virtual viewpoint image group generated based on the captured images are stored in the image storage unit 204, for example, in Material exchange Format (MXF) as a graphic format. The captured images and the virtual viewpoint image group generated based on the captured images stored in the image storage unit 204 are compressed, for example, in the Moving Picture Experts Group 2 (Mpeg2) format.

The virtual viewpoint image generation unit 205 generates a virtual viewpoint image group based on a plurality of captured images stored in the image storage unit 204. An example of a method for generating a virtual viewpoint image group is a method using image base rendering. Image base rendering refers to a rendering method for generating a virtual viewpoint image based on captured images of a plurality of viewpoints without performing modeling (a process of generating an object shape by using a geometric configuration). The method for generating a virtual viewpoint image group is not limited to image base rendering, and Model-Based Rendering (MBR) may be applied. MBR is a method for generating a virtual viewpoint image by using a three-dimensional model generated based on a plurality of images of a subject captured from a plurality of directions. Specifically, MBR is a technique for generating a view of a scene from a virtual viewpoint as an image by using a three-dimensional shape (model) of a target scene obtained by a three-dimensional shape restoration technique such as Volume Intersection and Multi-View-Stereo (MVS). The virtual viewpoint image generation unit 205 supplies data indicating the rotation base point to be generated by the rotation base point data generation unit 206 (described below) to the output virtual viewpoint image group.

The virtual viewpoint image group generated by the virtual viewpoint image generation unit 205 includes virtual viewpoint images for various viewpoint positions and line-of-sight directions. These virtual viewpoint images are compression-coded in the space and time axis directions as one image stream. Although a virtual viewpoint image group will be described below to be compression-coded in the space and time axis directions as one image stream, the virtual viewpoint image group is not limited thereto. The virtual viewpoint image group may not be one image stream and may include a plurality of independent images. Further, the virtual viewpoint image group does not necessarily be compression-coded.

The image generation apparatus 200 may generate, instead of generating a virtual viewpoint image group, information for generating a virtual viewpoint image, such as information that indicates a three-dimensional model and an image subjected to mapping to the three-dimensional model. In other words, the virtual viewpoint image generation unit 205 may generate, instead of generating a rendered virtual viewpoint image, information required for the information processing apparatus 100 or the user terminal 300 to render the virtual viewpoint image. The rotation base point data generation unit 206 outputs, as the rotation base point position, position information about a specific object or specific position acquired by the image analysis unit 207 (described below), to the virtual viewpoint image generation unit 205. The rotation base point is a reference point used for determining the viewpoint of the virtual viewpoint image. The information processing apparatus 100 determines, as the position of the viewpoint for the virtual viewpoint image, the point of the position of the user terminal 300 rotated centering on the rotation base point. The rotation base point may be used not only as a center of rotation but also as a base to be used for determining the viewpoint of the virtual viewpoint image. For example, the information processing apparatus 100 may also use the rotation base point to determine the line-of-sight direction for the virtual viewpoint image, for example, by setting the rotation base point viewed from the viewpoint for the virtual viewpoint image to the center of the virtual viewpoint image. For example, the information processing apparatus 100 may determine, as the position of the viewpoint for the virtual viewpoint image, a point that has been moved from the position of the user terminal 300 toward the rotation base point over a predetermined distance, in the case of a sporting event, the position of the rotation base point may be the position of a specific object, such as a person (a specific player or referee) and a ball, to be captured by at least one of the plurality of cameras. The position of the rotation base point may be a specific fixed position on the field, such as the field center, a position in front of a goal, and the position of a penalty mark, to be captured by at least one of the plurality of cameras. A preregistered arbitrary position may be used as the rotation base point.

The image analysis unit 207 analyzes captured images input to the captured image input unit 203, and acquires position information about the rotation base point. By using a technique such as Visual Hull, the image analysis unit 207 acquires position information about a specific object or a specific position as the rotation base point. As described above, in the case of a sporting event, the specific object refers to a person (a specific player or referee) or a ball. The rotation base point may be a predetermined position on the field, such as the field center, a position in front of a goal, or the position of a penalty mark. When the plurality of cameras is installed so that the optical axes of the cameras are oriented toward a common position, the rotation base point may exist at the common position. A technique discussed in Japanese Patent Application Laid-Open No. 2015-187797 is applicable as a method for determining position information about a specific object based on a plurality of captured images. The position of the rotation base point may be determined by using information such as the position information and orientation information about the user terminal 300.

The data output unit 208 outputs the virtual viewpoint image group generated by the virtual viewpoint image generation unit 205 with a predetermined frame rate, to the information processing apparatus 100.

Operations of the thus-configured image processing system will be described below.

<Virtual Viewpoint Determination Processing>

Virtual viewpoint determination processing performed by the information processing apparatus 100 will be described below. The virtual viewpoint determination processing is performed by the information processing apparatus 100 to determine the viewpoint of the virtual viewpoint image based on the user position information.

Figure 4:
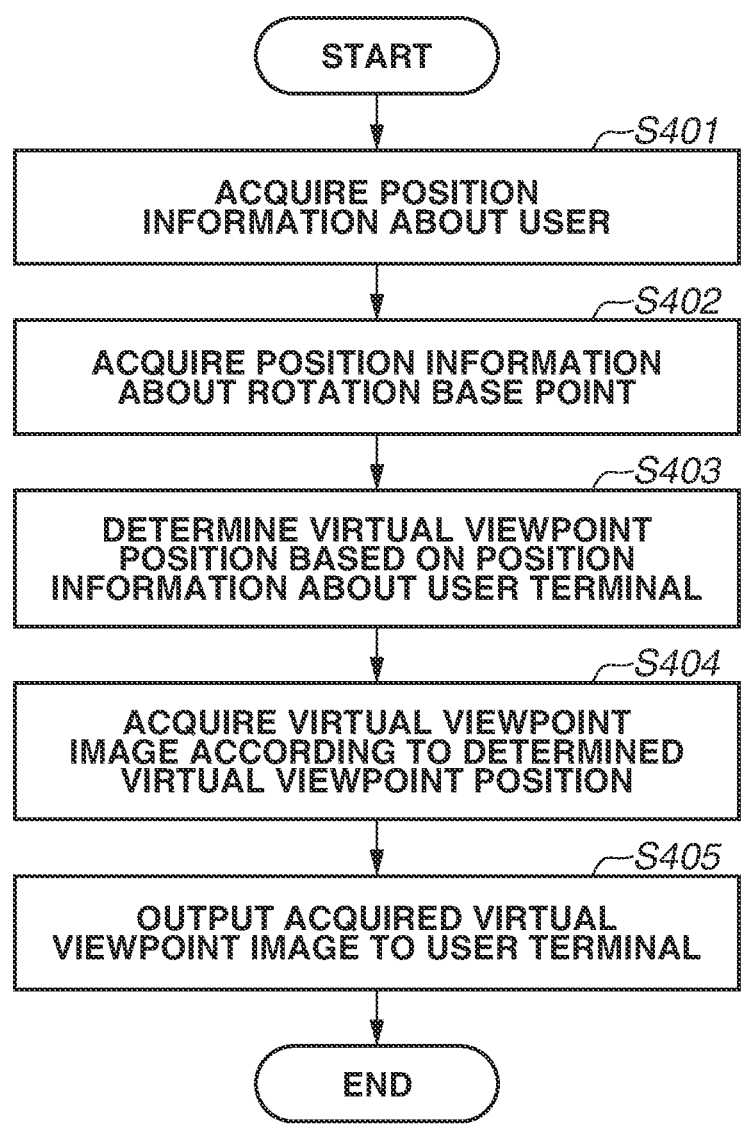
FIG. 4 is a flowchart illustrating a flow of processing for determining a virtual viewpoint.

FIG. 4 is a flowchart illustrating an example of virtual viewpoint determination processing performed by the information processing apparatus 100. The flowchart illustrated in FIG. 4 is started, for example, when the information processing apparatus 100 is requested for the virtual viewpoint image determination processing by the user terminal 300. The flowchart illustrated in FIG. 4 may be started when the information processing apparatus 100 acquires a virtual viewpoint image group. The processing of the flowchart illustrated in FIG. 4 is implemented when the CPU 701 controls operations of information and each hardware component. At least a part of steps of the flowchart illustrated in FIG. 4 may be executed by dedicated hardware. The dedicated hardware includes an ASIC and FPGA.

In step S401, the information processing apparatus 100 acquires user position information via the acquisition unit 104. The position information may be acquired by the user terminal 300 through a GPS. The acquisition unit 104 may also calculate position information based on the seat number of the spectators' seating area of the stadium input by the user. If the acquired position information is out of a predetermined range defined based on the imaging target, for example, the stadium having the field as the imaging target, the information processing apparatus 100 may terminate the processing as an error. In step S401, if the information processing apparatus 100 acquires position information indicating a position where the imaging target by the plurality of cameras cannot be viewed, the information processing apparatus 100 may terminate the processing as an error. In these cases, the information processing apparatus 100 may display information indicating an error on the user terminal 300. The information indicating an error displayed on the user terminal 300 may be information about the cause of the error or information prompting re-acquisition of position information, for example, "Unsuitable position information. Move in the stadium and then acquire position information again".

In step S402, the information processing apparatus 100 acquires rotation base point data related to the virtual viewpoint image group acquired from the image generation apparatus 200, and acquires position information about the rotation base point to be used to determine the virtual viewpoint indicated by the rotation base point data.

In step S403, the information processing apparatus 100 determines the viewpoint of the virtual viewpoint image based on the user position information acquired in step S401 and the position of the rotation base point acquired in step S402. A method for determining a viewpoint will be described below with reference to FIGS. 5 and 6.

Figure 5:
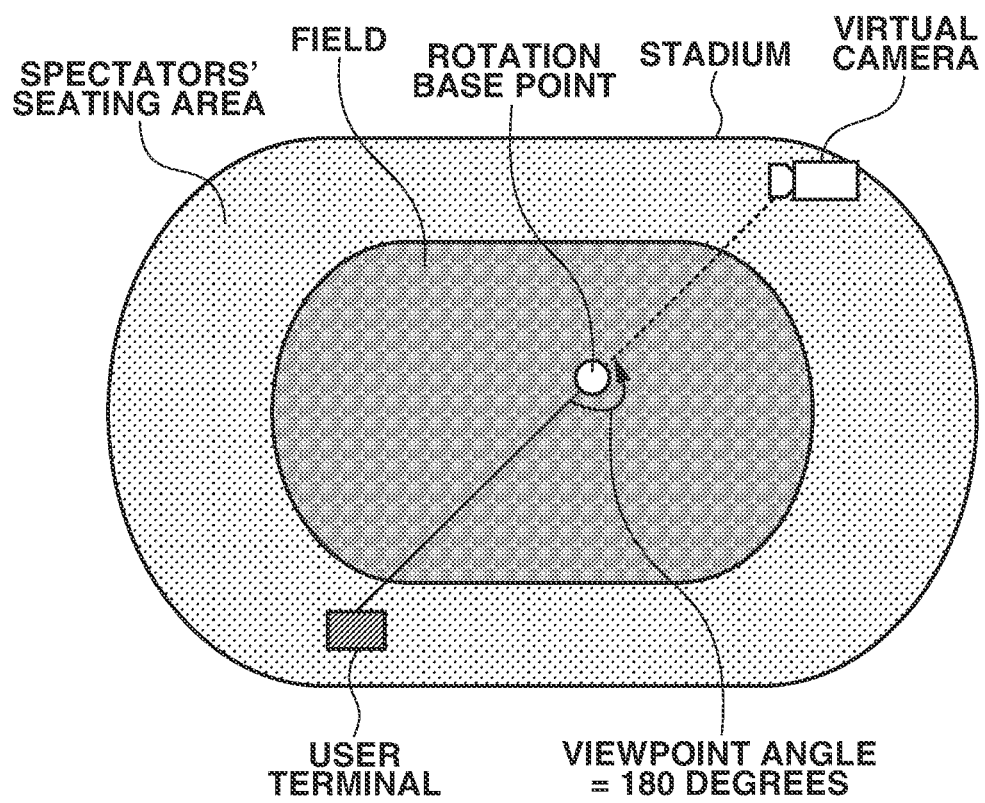
FIG. 5 illustrates an example of a method for determining an angle of a line-of-sight of a virtual viewpoint and a position of a virtual viewpoint.

FIG. 5 is an overhead view of the stadium, illustrating a method for determining the virtual viewpoint according to the present exemplary embodiment. Assume that the user is at the position of the user terminal 300, and the rotation base point is the position of the ball. As described above, the rotation base point may be the position of a person (a specific player or referee). When the plurality of cameras is installed so that the optical axes of the cameras are oriented toward a common position, the rotation base point may exist at the common position. The rotation base point may also be an arbitrary position on the field. Based on the position information about the user terminal 300, the information processing apparatus 100 performs processing assuming that the user terminal 300 (user) exists at one point on three-dimensional coordinates.

The information processing apparatus 100 determines, as the position of the virtual viewpoint, a position where an angle formed by the line connecting a point of the user terminal 300 and the rotation base point and the line connecting the rotation base point and the virtual viewpoint is 180 degrees in the overhead view of the stadium. In other words, the information processing apparatus 100 determines, as the position of the virtual viewpoint, a position where an angle formed by the line connecting the user terminal 300 and the rotation base point and the line connecting the rotation base point and the virtual viewpoint is 180 degrees when the imaging target is viewed from above. The information processing apparatus 100 also determines, as the position of the virtual viewpoint, a position where the point of the user terminal 300 is projected on a plane parallel to the field is rotated by 180 degrees, centering on the point where the rotation base point is projected on a plane parallel to the field.

FIG. 5 illustrates a virtual camera at the position of the virtual viewpoint to be determined. The information processing apparatus 100 assumes that the line-of-sight direction of the virtual viewpoint is the direction toward the rotation base point. In this way, the information processing apparatus 100 determines, as the position of the virtual viewpoint, the position point-symmetrical with respect to the position of the user terminal 300 centering on the rotation base point. The information processing apparatus 100 also determines, as the position of the virtual viewpoint, the position as a result of point-symmetrically moving the position of the user terminal 300 centering on the rotation base point. Therefore, according to the present exemplary embodiment, the user can view a virtual viewpoint image reflecting the target position from a position which cannot be acquired by the user, without complicated operations for determining the position of the virtual viewpoint.

The information processing apparatus 100 may determine the angle of view of the virtual viewpoint image to be output. For example, the information processing apparatus 100 may set the angle of view of the virtual viewpoint image so that the angle of view for the virtual viewpoint image to be generated increases with decreasing distance between the user and the rotation base point. In this case, the information processing apparatus 100 provides a user who is close to the rotation base point with a virtual viewpoint image of a wide angle view, and provides a user who is far from the rotation base point with a virtual viewpoint image of a narrow angle view. The information processing apparatus 100 may make setting so that the angle of view for the virtual viewpoint image becomes narrower as distance between the user and the rotation base point becomes shorter. The angle of view of the virtual viewpoint image may be set to a fixed value which is not varied.

The information processing apparatus 100 may set, as the position of the viewpoint for the virtual viewpoint image, the point as a result of point-symmetrically moving the point existing at the position of the user terminal 300 centering on the rotation base point, and then moving the point over a predetermined distance in a predetermined direction. For example, the information processing apparatus 100 may set, as the position of the viewpoint for the virtual viewpoint image, the point as a result of moving the point (after the rotation) over a predetermined distance in a direction toward or away from the rotation base point.

The information processing apparatus 100 may determine, as the position of the virtual viewpoint, an arbitrary point on the line connecting the rotation base point and the virtual viewpoint, where a predetermined angle is formed between the line connecting the user terminal 300 and the rotation base point and the line connecting the rotation base point and the virtual viewpoint.

Figure 6:
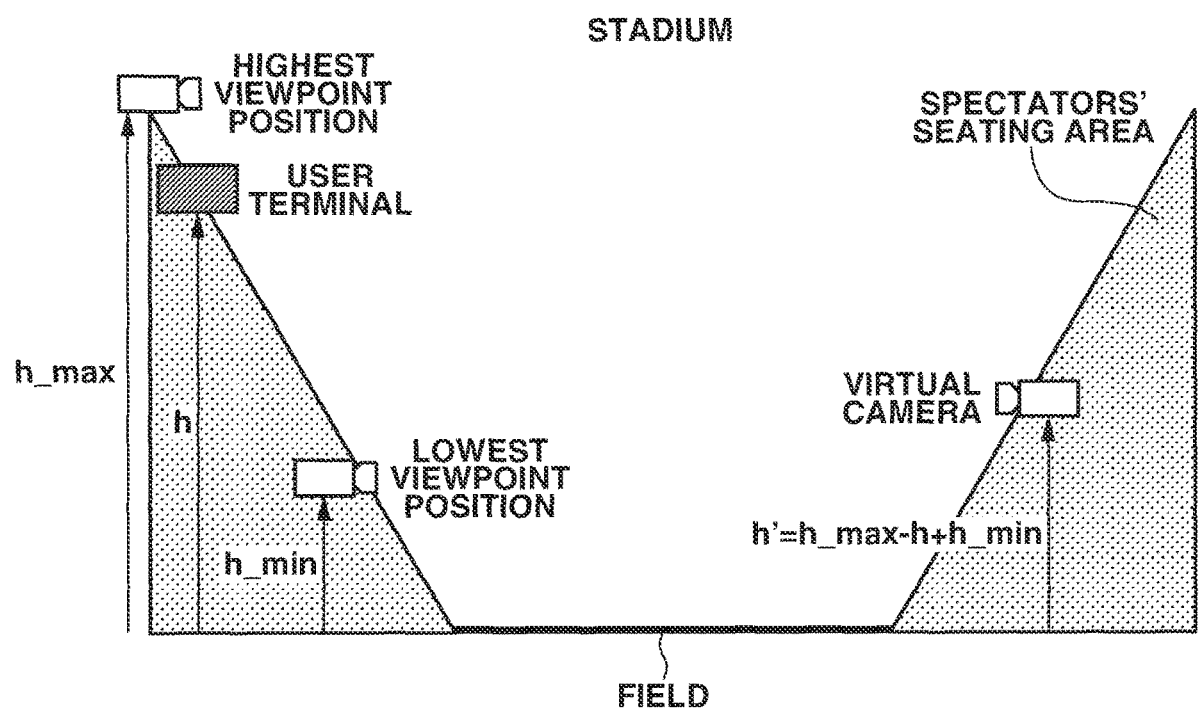
FIG. 6 illustrates an example of a method for determining a height of a virtual viewpoint.

Next, a method for determining the height of a virtual viewpoint will be described. FIG. 6 is a side view of the stadium, illustrating a method for determining the height of a virtual viewpoint according to the present exemplary embodiment. Referring to FIG. 6, the user is at the position of the user terminal 300 at a height of h. The highest viewpoint position indicates the position of the camera at the highest altitude (h_max) among the cameras installed in the stadium. The lowest viewpoint position indicates the position of the camera at the lowest altitude (h_min) among the cameras installed in the stadium. The information processing apparatus 100 sets the height h' of the virtual camera as h'=h_max−h+h_min. In this way, according to the height of the user terminal 300, the information processing apparatus 100 sets the height of the virtual viewpoint to a different value from the height of the user terminal 300. For example, if the user is at a high position in the spectators' seating area, an image viewed from a low position close to the field is displayed on the user terminal 300. If the user is at a low position of the spectators' seating area, an image of the field viewed from a high position is displayed on the user terminal 300. Generating virtual viewpoint images having a different height from the user's viewpoint enables the user to watch the imaging target such as an event from various fields of view. Although the above descriptions have been made on the premise that the height of the virtual camera is different from the height of the user's viewpoint, the height of the virtual camera may be the same as the height of the user's viewpoint or may be set to an arbitrary fixed height.

In step S404, the information processing apparatus 100 acquires the virtual viewpoint image based on the viewpoint determined in step S403 from the image acquisition unit 106. The image acquisition unit 106 acquires the virtual viewpoint image as the viewpoint from which the rotation base point was captured from the virtual camera position determined in step S403.

In step S404, the information processing apparatus 100 acquires the virtual viewpoint image by selecting a virtual viewpoint image corresponding to the determined position, angle of view, and height of the virtual camera from a virtual viewpoint image group. The information processing apparatus 100 may select a virtual viewpoint image having a position, angle of view, and height close to the determined position, angle of view, and height of the virtual camera from the virtual viewpoint image group, and acquire the virtual viewpoint image corresponding to the position, angle of view, and height of the virtual camera determined, by performing image processing on the selected virtual viewpoint image.

The information processing apparatus 100 may also select a virtual viewpoint image corresponding to the position of the virtual viewpoint determined from the virtual viewpoint image group, and then perform digital zooming on the selected virtual viewpoint image. The information processing apparatus 100 may generate a virtual viewpoint image corresponding to the angle of view and height determined by performing digital zooming on the virtual viewpoint image selected from the virtual viewpoint image group.

The information processing apparatus 100 may acquire information for generating a virtual viewpoint image, such as an image to be used for a three-dimensional model and mapping, from the image generation apparatus 200, and then render the virtual viewpoint image corresponding to the determined position, height, and angle of view of the virtual viewpoint.

The information processing apparatus 100 may move the determined virtual camera position back and forth in the optical axis direction while maintaining a constant angle of view of the virtual viewpoint image, and then acquire the virtual viewpoint image corresponding to the virtual camera position after the movement to change the range of the scene to be reflected in the virtual viewpoint image.

In step S405, the information processing apparatus 100 outputs the virtual viewpoint image acquired in step S404 to the user terminal 300 via the image output unit 107.

As described above, according to the present exemplary embodiment, the information processing apparatus 100 determines the position of the viewpoint of the viewpoint virtual image based on the position information about the user terminal 300. This enables the user to display an image which cannot be viewed from the user position on the user terminal 300, without performing complicated operations.

According to the present exemplary embodiment, the user can view the event on the display apparatus through a virtual viewpoint image from a viewpoint from which the event can hardly be viewed from the user's position. It is useful for the user. This enables even a user unfamiliar with virtual viewpoint setting to easily view a virtual viewpoint image based on the user position and rotation base point, without performing complicated operations.

Although, in the above descriptions, the information processing apparatus 100 determined a virtual viewpoint by using the position information about the subject as the rotation base point of the virtual viewpoint image, the processing for determining a virtual viewpoint is not limited thereto. For example, the information processing apparatus 100 may determine the position indicated by the position information about the user terminal 300 as the position of the virtual viewpoint, without using the rotation base point. In other words, the information processing apparatus 100 may set the position of the user terminal 300 as the virtual camera position. Performing processing in this way enables setting the position of the user terminal 300 as the position of the virtual viewpoint, without complicated operations by the user. Thus the information processing apparatus 100 sets the position of the user terminal 300 as the virtual camera position, enabling the user to easily recognize the virtual camera position. The user can easily set a desired position as the position of the virtual viewpoint by performing an input operation for moving the virtual camera.

The information processing apparatus 100 may perform control to display on the user terminal 300 a warning indicating that the user needs to directly view the game or event based on the user position information and position information about the target subject as the rotation base point. For example, if the distance between the position of the user terminal 300 and the position of the rotation base point (for example, the ball or a specific player) is a predetermined distance or shorter, the information processing apparatus 100 determines that the user needs to directly view the game, and performs control to display the above-described warning on the user terminal 300. This warning may also be displayed by being superimposed onto the virtual viewpoint image to be output to the user terminal 300. As described above, in a game scene the user needs to directly view, displaying warning information enables preventing the user from missing a scene of the game while concentrating on operations of the user terminal 300.

In the above descriptions, the image generation apparatus 200 is configured to generate a virtual viewpoint image group corresponding to a plurality of viewpoints before the viewpoint of the virtual viewpoint image to be output to the user terminal 300 has been determined. However, the processing is not limited thereto. The image generation apparatus 200 may also be configured to determine the viewpoint position and line-of-sight direction for the virtual viewpoint image to be output to the user terminal 300, acquire information about this viewpoint and then generate a virtual viewpoint image corresponding to the determined viewpoint. Also, in the above descriptions, the user terminal 300 is configured to display an image rendered by the image generation apparatus 200. However, the user terminal 300 may be configured to display a virtual viewpoint image rendered by the information processing apparatus 100 or the user terminal 300 based on the information received from the image generation apparatus 200.

In step S401, the information processing apparatus 100 may acquire not only the position information about the user terminal 300 but also information about the orientation of the user terminal 300. In this case, the information processing apparatus 100 acquires information about the orientation acquired through the electronic compass of the user terminal 300. The information processing apparatus 100 may identify a subject as the rotation base point based on the position and orientation of the user terminal 300. For example, the information processing apparatus 100 may identify a player existing in the direction in which the user terminal 300 is oriented by the user as the rotation base point.

Although, in the above descriptions, the information processing apparatus 100 determines, as the position of the virtual viewpoint, the position point-symmetrical with respect to the position of the user terminal 300 centering on the rotation base point, this is not limited thereto. For example, the information processing apparatus 100 may determine, as the position of the virtual viewpoint, a position where an arbitrary predetermined angle is formed by the line connecting the user terminal 300 and the rotation base point and the line connecting the rotation base point and the virtual viewpoint. Further, the information processing apparatus 100 may determine, as the position of the virtual viewpoint, a position where a unique angle is formed by the line connecting the user terminal 300 and the rotation base point and the line connecting the rotation base point and the virtual viewpoint. The information processing apparatus 100 may also determine the position of the virtual viewpoint based on an angle range, for example, from 150 to 210 degrees.

Although, in the above-described exemplary embodiment, one rotation base point is used, a plurality of rotation base points may be used. In this case, the information processing apparatus 100 may determine the viewpoint position and line-of-sight direction for the virtual viewpoint image based on the positions of the plurality of rotation base points and the user position. For example, the information processing apparatus 100 rotates the point assumed to exist at the user position when the imaging target is viewed from above by a first angle centering on a first rotation base point. After the rotation by the first angle, the information processing apparatus 100 may further rotates the point by a second angle centering on a second rotation base point and set the point position after the rotation by the second angle as the viewpoint for the virtual viewpoint image. The first and the second angles may be identical or different. The information processing apparatus 100 may set the center of gravity of a triangle formed by connecting the first rotation base point, the second rotation base point, and the user position as the position of the viewpoint for the virtual viewpoint image. Further, for example, the information processing apparatus 100 may set, as the position of the viewpoint for the virtual viewpoint image, a position where the plurality of rotation base points can be captured. Providing a plurality of rotation base points, as described above, enables generating a virtual viewpoint image in consideration of the plurality of rotation base points.

Although, in the above descriptions, the information processing apparatus 100 determines the position and direction of the virtual viewpoint by using the angle formed by the line connecting the user terminal 300 and the rotation base point and the line connecting the rotation base point and the virtual viewpoint, the determination method is not limited thereto. The information processing apparatus 100 may determine the position indicated by the position information about the user terminal 300 as the position of the virtual viewpoint and then determine the direction from the position of the virtual viewpoint toward the rotation base point as the direction of the virtual viewpoint. This processing firstly display a virtual viewpoint image close to the user's field of view in real space on the user terminal 300, and thus makes subsequent virtual camera operations easier for the user at the user terminal 300. If the distance from the position of the virtual viewpoint to the rotation base point is longer than or equal to a predetermined distance, the information processing apparatus 100 may correct the position of the virtual viewpoint. In this case, the information processing apparatus 100 may move the position of the virtual viewpoint so that the distance from the rotation base point to the position of the virtual viewpoint becomes shorter than the predetermined value. Performing processing in this way enables generating a virtual viewpoint image at a position closer to the imaging target than the user's viewpoint, improving visibility.

Figure 8:
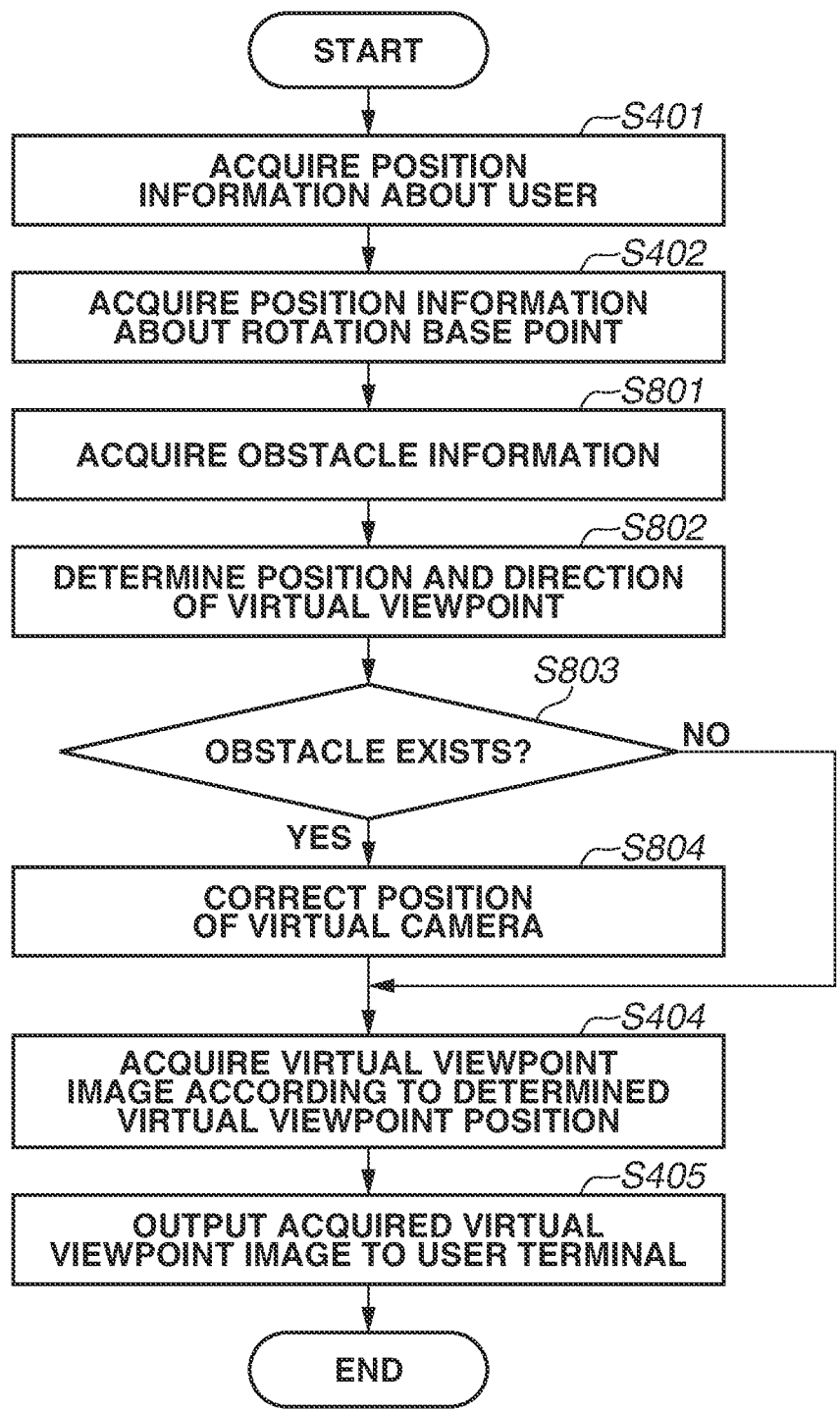
FIG. 8 is a flowchart illustrating an example of processing for correcting a position of a virtual viewpoint.

Although, in the above descriptions of position correction, the information processing apparatus 100 moves the virtual viewpoint in the horizontal and vertical directions, the processing is not limited thereto. An example of processing for correcting the position of the virtual viewpoint will be described below with reference to the flowchart illustrated in FIG. 8. Referring to FIG. 8, steps identical to those in FIG. 4 are assigned the same reference numerals, and descriptions thereof will be omitted. The following describes differences from the flowchart illustrated in FIG. 4.

Referring to FIG. 8, after performing the processing in step S401 and acquiring the position information about the rotation base point in step S402, then in step S801, the information processing apparatus 100 acquires obstacle information via the acquisition unit 104. The obstacle information refers to information indicating positions and sizes of specific objects such as players and balls, and objects and structures which may possibly hide the field as the imaging target in the imaging ranges of the plurality of cameras. An example of obstacle information is illustrated in FIG. 9. Referring to the example illustrated in FIG. 9, the obstacle information includes the installation positions (latitude/longitude in degrees) and the sizes (width×height×depth) of obstacles existing on the field as the imaging ranges of the plurality of cameras. The obstacle information is not limited to this format and may be represented, for example, by three-dimensional model information. Examples of obstacles indicated by the obstacle information include the goals, advertisements, and benches. Obstacles indicated by the obstacle information are not limited to thereto, and may include other objects and structures.

In step S802, the information processing apparatus 100 determines the position and direction of the virtual viewpoint based on the user position information acquired in step S401 and the position of the rotation base point acquired in step S402. In step S803, the information processing apparatus 100 determines whether an obstacle exists on the straight line connecting the position of the virtual viewpoint before the correction determined in step S802 and the rotation base point. In step S803, if a virtual viewpoint image is generated at the position of the virtual viewpoint before the correction, the information processing apparatus 100 may determine whether obstacles indicated by the obstacle information are reflected in the virtual viewpoint image to be generated. In step S803, when a virtual viewpoint image is generated at the position of the virtual viewpoint before the correction, the information processing apparatus 100 may determine whether any one of the obstacles indicated by the obstacle information hide a specific object such as a person and the ball in the virtual viewpoint image to be generated. When such an obstacle exists (YES in step S803), the processing proceeds to step S804. In step S804, the information processing apparatus 100 performs correction processing. On the other hand, when such an obstacle does not exist (NO in step S803), the processing proceeds to step S404 (the correction processing is skipped).

Figure 10:
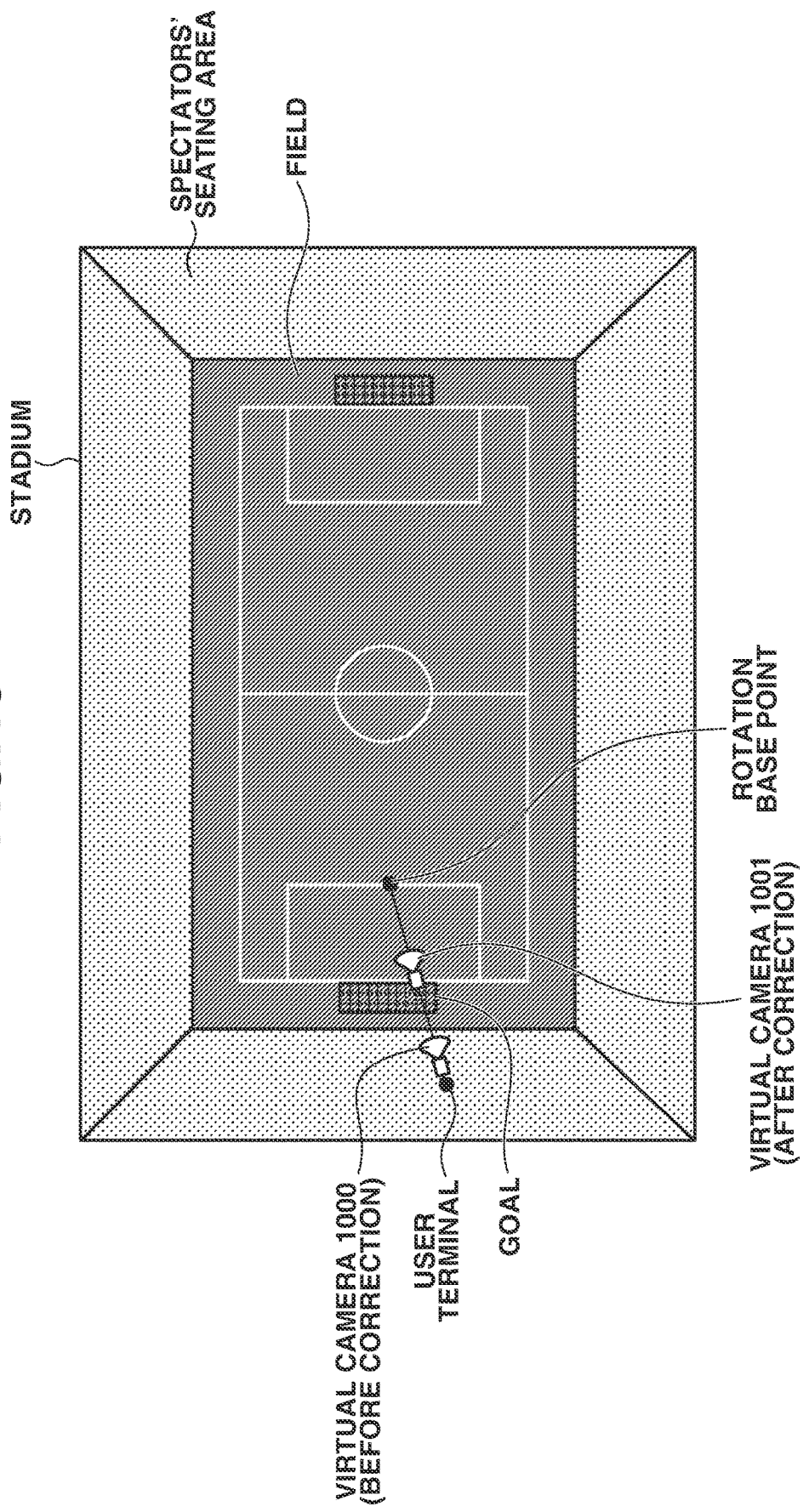
FIG. 10 illustrates an example of correcting a position of a virtual viewpoint in the horizontal direction.
Figure 11:
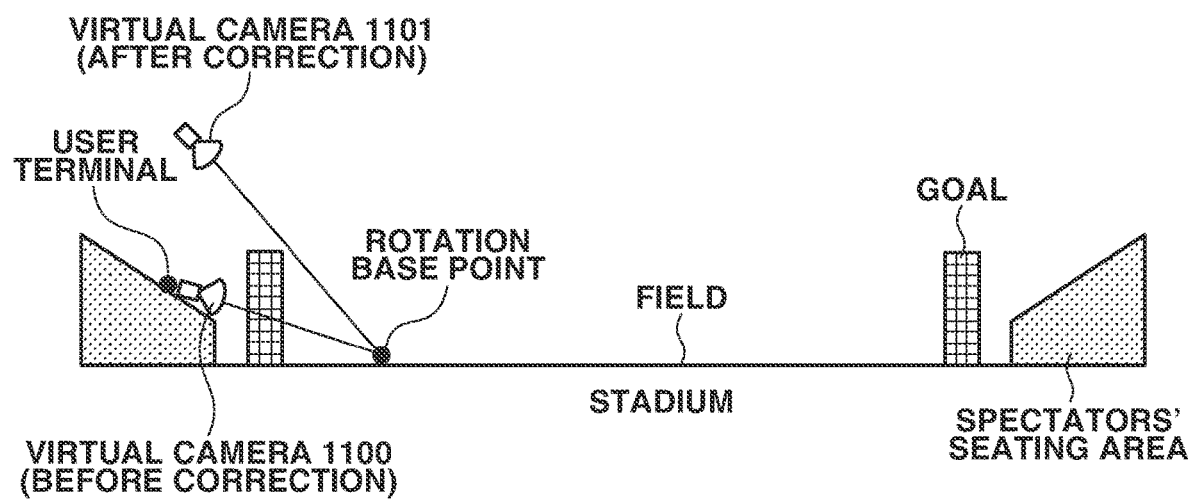
FIG. 11 illustrates an example of correcting the position of a virtual viewpoint in the vertical direction.

In step S804, when an obstacle exists on the straight line connecting the position of the virtual camera (before the correction) and the position of the rotation base point, the information processing apparatus 100 moves the position of the virtual camera up to a position where the obstacle no longer hides the rotation base point. Correction of the position of the virtual camera will be described below with reference to FIG. 10 and FIG. 11. FIG. 10 is an overhead view of the stadium, illustrating that the goal as an obstacle exists between a virtual camera 1000 before the correction and the rotation base point. FIG. 10 illustrates an example case where, in step S802, the information processing apparatus 100 sets the direction and position of the virtual camera to the direction from the position of the user terminal 300 toward the rotation base point. Referring to FIG. 10, the information processing apparatus 100 moves the virtual camera 1000 toward the rotation base point on the straight line connecting the virtual camera 1000 and the rotation base point up to the position of a virtual camera 1001 in front of the goal. The position of the virtual camera can be corrected not only in the horizontal direction but also in the vertical direction as illustrated in FIG. 11. FIG. 11 is a side view of the stadium. In this case, the information processing apparatus 100 raises the virtual camera 1100 until the straight line connecting the virtual camera 1100 and the rotation base point comes out of contact with the goal, i.e., the information processing apparatus 100 moves the position of the virtual camera up to the position of the virtual camera 1101. In step S804, the information processing apparatus 100 may adjust the position of the virtual viewpoint by moving the position of the virtual viewpoint up to a position where the obstacle no longer hides a specific object such as a person and the ball existing at the rotation base point or in the vicinity thereof. In step S804, the information processing apparatus 100 may adjust the position of the virtual viewpoint by moving the position of the virtual viewpoint up to a position where the obstacle is not reflected in the virtual viewpoint image. In step S804, the information processing apparatus 100 may adjust the position of the virtual viewpoint by rotating the position of the virtual viewpoint centering on the rotation base point.

This correction of the position of the virtual camera prevents the obstacle from being reflected in the virtual viewpoint image to be displayed, thus makes subsequent virtual camera operations easier. Since the information processing apparatus 100 determines the position of the viewpoint for the virtual viewpoint image so that no obstacle is reflected, a virtual viewpoint image for improving visibility can be generated. Obstacles included in the obstacle information are not limited to the obstacles on the field, and may include spectators around the user terminal 300, imaging apparatuses, and flags. The information processing apparatus 100 may correct the position of the virtual viewpoint based on, for example, data acquired by a human sensor mounted on the user terminal 300.

Although, in the above-described exemplary embodiment, the information processing apparatus 100 determines the viewpoint for the virtual viewpoint image with reference to a point (rotation base point), the information processing apparatus 100 may determine the viewpoint for the virtual viewpoint image with reference to an axis. In this case, the information processing apparatus 100 may set, as the position of the viewpoint for the virtual viewpoint image, a point assumed to exist at the user position rotated by a predetermined angle centering on an axis (rotation base axis) as a reference for determining the viewpoint for the virtual viewpoint image.

Although, in the above-described exemplary embodiment, the information processing apparatus 100 acquired the rotation base point data indicating a rotation base point attached to a virtual viewpoint image group, the rotation base point data may be obtained separately from a virtual viewpoint image group.

The information processing apparatus 100 described above makes it easier to set the viewpoint of a virtual viewpoint image.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., ASIC) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-248475, filed Dec. 25, 2017, which is hereby incorporated by reference herein in its entirety.

What is claimed is:
1. An information processing apparatus comprising:
one or more hardware processors; and one or more memories which store instructions executable by the one or more hardware processors to cause the information processing apparatus to perform at least:

acquiring information for specifying a first position corresponding to a position of a user whose display apparatus displays a virtual viewpoint image based on a plurality of images obtained by a plurality of imaging apparatuses imaging an imaging target region or a position of the display apparatus;

specifying a second position in the imaging target region based on the plurality of images;

determining, based on a positional relationship between the first position specified based on the acquired information and the specified second position, a third position of a virtual viewpoint and a view direction from the third position used for generating the virtual viewpoint image such that the third position of the virtual viewpoint is different from the first position specified based on the acquired information and the view direction is different from a direction from the specified first position toward the specified second position; and outputting, for causing the display apparatus of the user to display, the virtual viewpoint image which corresponds to the determined third position of the virtual viewpoint and the view direction from the third position and includes the specified second position.

2. The information processing apparatus according to claim 1, wherein the first position is related to the user who is inside of a stadium including the imaging target region.

3. The information processing apparatus according to claim 1, wherein the specified second position is a position of a specific object included in the imaging target region.

4. The information processing apparatus according to claim 3, wherein the specific object is a person or a ball.

5. The information processing apparatus according to claim 1, wherein the position of the virtual viewpoint is determined so that a predetermined angle is formed by a line connecting the first position specified based on the acquired information and the specified second position and a line connecting the specified second position and the position of the virtual viewpoint.

6. The information processing apparatus according to claim 1, wherein the instructions further cause the information processing apparatus to perform determining, based on the first position specified based on the acquired information and the specified second position, an angle of view for generating the virtual viewpoint image.

7. The information processing apparatus according to claim 1, wherein the instructions further cause the information processing apparatus to perform determining a view direction from the virtual viewpoint for generating the virtual viewpoint image so that the specified second position is included in the virtual viewpoint image.

8. The information processing apparatus according to claim 1, wherein the instructions further cause the information processing apparatus to perform outputting a warning to the user if a distance between the first position specified based on the acquired information and the specified second position is shorter than a predetermined distance.

9. The information processing apparatus according to claim 8, wherein in the outputting, a warning for prompting the user to directly view the specified second position is output.

10. The information processing apparatus according to claim 1, wherein the specified second position is a field center, a position in front of a goal, or a position of a penalty mark in the imaging target region.

11. The information processing apparatus according to claim 1, wherein the instructions further cause the information processing apparatus to perform determining, based on the first position specified based on the acquired information, a height of the virtual viewpoint.

12. The information processing apparatus according to claim 11, wherein, based on a height of the first position specified based on the acquired information and a height at which the plurality of imaging apparatuses is installed, the height of the virtual viewpoint is determined.

13. The information processing apparatus according to claim 1, wherein in the acquiring, the information about another information processing apparatuses owned by the user is acquired.

14. The information processing apparatus according to claim 1, wherein the instructions further cause the information processing apparatus to perform acquiring obstacle information about obstacles which can hide the specified second position, wherein the position of the virtual viewpoint is determined further based on the obstacle information.

15. The information processing apparatus according to claim 14, wherein the obstacles include at least one of goals, advertisements, benches, imaging apparatuses, and spectators.

16. The information processing apparatus according to claim 1, wherein the position of the virtual viewpoint is determined such that a direction from the first positon specified based on the acquired information to the specified second position is different from a direction from the position of the virtual viewpoint to the specified second position.

17. An information processing method, the method comprising:

acquiring information for specifying a first position corresponding to a position of a user whose display apparatus displays a virtual viewpoint image based on a plurality of images obtained by a plurality of imaging apparatuses imaging an imaging target region or a positon of the display apparatus;

specifying a second position in the imaging target region based on the plurality of images;

determining, based on a positional relationship between the first position specified based on the acquired information and the specified second position, a third position of a virtual viewpoint and a view direction from the third position used for generating the virtual viewpoint image such that the position of the virtual viewpoint is different from the first position specified based on the acquired information and the view direction is different from a direction from the specified first position toward the specified second position; and outputting, for causing the display apparatus of the user to display, the virtual viewpoint image which corresponds to the determined third position of the virtual viewpoint and the view direction from the third postion and includes the specified second position.

18. A non-transitory computer-readable recording medium storing a program for causing a computer to execute an information processing method, the method comprising:

acquiring information for specifying a first position corresponding to a position of a user whose display apparatus displays a virtual viewpoint image based on a plurality of images obtained by a plurality of imaging apparatuses imaging an imaging target region or a positon of the display apparatus;

specifying a second position in the imaging target region based on the plurality of images;

determining, based on a positional relationship between the first position specified based on the acquired information and the specified second position, a third position of a virtual viewpoint and a view direction from the third position used for generating the virtual viewpoint image such that the position of the virtual viewpoint is different from the first position specified based on the acquired information and the view direction is different from a direction from the specified first position toward the specified second position; and outputting, for causing the display apparatus of the user to display, the virtual viewpoint image which corresponds to the determined third position of the virtual viewpoint and the view direction from the third postion and includes the specified second position.

\* \* \* \* \*